US012591185B2

(12) United States Patent
Tatekawa et al.

(10) Patent No.: US 12,591,185 B2
(45) Date of Patent: Mar. 31, 2026

(54) FLUORESCENT GREEN TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Takahisa Tatekawa, Kanagawa (JP); Yukiaki Nakamura, Kanagawa (JP); Kohei Manabe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 471 days.

(21) Appl. No.: 18/154,049

(22) Filed: Jan. 13, 2023

(65) Prior Publication Data

US 2023/0384700 A1 Nov. 30, 2023

(30) Foreign Application Priority Data

May 27, 2022 (JP) ................................ 2022-086989

(51) Int. Cl.

| | |
|---|---|
| ***G03G 9/09*** | (2006.01) |
| ***C09K 11/06*** | (2006.01) |
| ***G03G 9/087*** | (2006.01) |
| ***G03G 9/093*** | (2006.01) |
| ***G03G 15/01*** | (2006.01) |

(52) U.S. Cl.

CPC ............ *G03G 9/0926* (2013.01); *C09K 11/06* (2013.01); *G03G 9/08782* (2013.01); *G03G 9/0918* (2013.01); *G03G 9/09307* (2013.01); *G03G 9/0935* (2013.01); *G03G 15/0105* (2013.01); *C09K 2211/10* (2013.01)

(58) Field of Classification Search

CPC ............ G03G 9/0926; G03G 9/08782; G03G 9/0918; G03G 9/09307; G03G 9/0935; G03G 15/0105; C09K 11/06; C09K 2211/10

See application file for complete search history.

(56) References Cited

U.S. PATENT DOCUMENTS

| | | | | |
|---|---|---|---|---|
| 8,568,947 | B2 | 10/2013 | Ohno et al. | |
| 11,884,816 | B2 | 1/2024 | Nakamura et al. | |
| 2005/0195420 | A1 * | 9/2005 | Gerrits .................. | G03G 15/01 358/1.13 |

(Continued)

FOREIGN PATENT DOCUMENTS

| | | |
|---|---|---|
| JP | 2012189989 | 10/2012 |
| JP | 2013101166 | 5/2013 |

(Continued)

OTHER PUBLICATIONS

"Notice of Reasons for Refusal of Japan Counterpart Application", issued on Dec. 16, 2025, with English translation thereof, p. 1-p. 5.

*Primary Examiner* — Mark F. Huff
*Assistant Examiner* — Boone Alexander Evans
(74) *Attorney, Agent, or Firm* — JCIPRNET

(57) ABSTRACT

A fluorescent green toner contains toner particles containing a binder resin, a release agent, a fluorescent pigment having a hydrophilic group, and a pigment having a halogen atom.

19 Claims, 2 Drawing Sheets

(56) References Cited

U.S. PATENT DOCUMENTS

| | | | | |
|---|---|---|---|---|
| 2010/0124717 | A1* | 5/2010 | Nakajima | C08J 3/21<br>430/110.3 |
| 2015/0248074 | A1* | 9/2015 | Suzuki | G03G 9/0926<br>430/105 |
| 2016/0177100 | A1* | 6/2016 | Mochizuki | C07D 471/04<br>428/195.1 |
| 2021/0018855 | A1* | 1/2021 | Sawada | G03G 9/0922 |
| 2021/0294233 | A1* | 9/2021 | Lu | G03G 9/0804 |

FOREIGN PATENT DOCUMENTS

| | | |
|---|---|---|
| JP | 2018180239 | 11/2018 |
| JP | 2021127431 | 9/2021 |

* cited by examiner

FLUORESCENT GREEN TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2022-086989 filed May 27, 2022.

BACKGROUND

(i) Technical Field

The present disclosure relates to a fluorescent green toner, an electrostatic charge image developer, a toner cartridge, a process cartridge, an image forming apparatus, and an image forming method.

(ii) Related Art

JP2012-189989A discloses a fluorescent green toner containing C.I. Solvent Green 5 and a phthalocyanine-based colorant compound X, in which a content of the C.I. Solvent Green 5 in the total amount of colorants is 5% by mass or more and 50% by mass or less.

JP2013-101166A discloses a coloring composition for a color filter containing a fluorescing colorant (A), an organic compound (B) represented by General Formula (1), and a binder resin (C).

*P-Lm* General formula (1)

[In General Formula (1),

P: an organic pigment skeleton or an aminobenzene skeleton

L: L consists of a basic functional group Lb, an acidic functional group La, or a functional group Lp having a phthalimide skeleton.

m: an integer of 1 to 4, representing the number of functional groups.]

SUMMARY

Aspects of non-limiting embodiments of the present disclosure relate to a fluorescent green toner from which an image having higher gloss difference suppressiveness is obtained, compared to a fluorescent green toner having toner particles containing a binder resin, a release agent, a fluorescent pigment having a hydrophilic group, and a pigment that does not have a halogen atom.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for achieving the above object include the following aspects.

According to an aspect of the present disclosure, there is provided a fluorescent green toner that contains toner particles containing a binder resin, a release agent, a fluorescent pigment having a hydrophilic group, and a pigment having a halogen atom.

BRIEF DESCRIPTION OF THE DRAWINGS

Exemplary embodiment(s) of the present invention will be described in detail based on the following figures, wherein.

DETAILED DESCRIPTION

Figure 1:
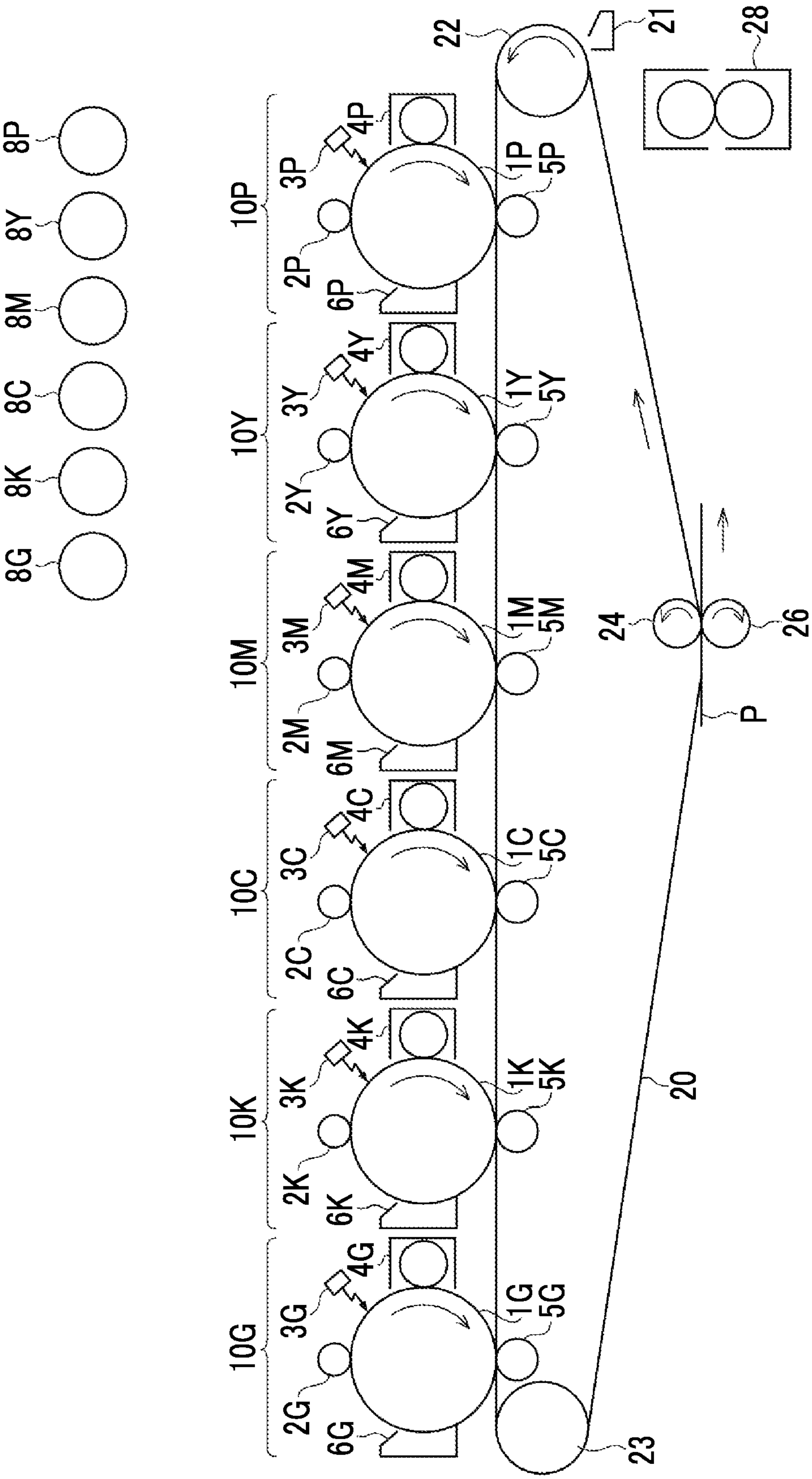
FIG. 1 is a view schematically showing the configuration of an example of an image forming apparatus according to the present exemplary embodiment.

The exemplary embodiments of the present disclosure will be described below. The following descriptions and examples merely illustrate the exemplary embodiments, and do not limit the scope of the exemplary embodiments.

In the present disclosure, a range of numerical values described using "to" represents a range including the numerical values listed before and after "to" as the minimum value and the maximum value respectively.

Regarding the ranges of numerical values described in stages in the present disclosure, the upper limit or lower limit of a range of numerical values may be replaced with the upper limit or lower limit of another range of numerical values described in stages. Furthermore, in the present disclosure, the upper limit or lower limit of a range of numerical values may be replaced with values described in examples.

In the present disclosure, the term "step" includes not only an independent step but a step which is not clearly distinguished from other steps as long as the goal of the step is achieved.

In the present disclosure, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present disclosure, each component may include a plurality of corresponding substances. In a case where the amount of each component in a composition is mentioned in the present disclosure, and there are two or more kinds of substances corresponding to each component in the composition, unless otherwise specified, the amount of each component means the total amount of two or more kinds of the substances present in the composition.

In the present disclosure, each component may include two or more kinds of corresponding particles. In a case where there are two or more kinds of particles corresponding to each component in a composition, unless otherwise specified, the particle size of each component means a value for a mixture of two or more kinds of the particles present in the composition.

In the present disclosure, "(meth)acryl" is an expression including both the acryl and methacryl, and "(meth)acrylate" is an expression including both the acrylate and methacrylate.

In the present disclosure, "fluorescent toner" is also called "toner", "fluorescent green toner" is also called "green toner", "electrostatic charge image developer" is also called "developer", and "electrostatic charge image developing carrier" is also called "carrier".

Fluorescent Green Toner

The fluorescent green toner according to the present exemplary embodiment contains toner particles containing a binder resin, a release agent, a fluorescent pigment having a hydrophilic group, and a pigment having a halogen atom.

The fluorescent green toner according to the present exemplary embodiment is an electrostatic charge image-developing fluorescent green toner, which means a toner that forms a solid image having a hue angle h of 120° or more and 150° or less on coated paper. The hue angle h is an angle calculated by the following equation from the a* value and the b* value in the CIE1976 L*a*b* color system.

$$\text{Hue angle } h=\tan^{-1}(b^*/a^*)$$

In the present disclosure, the hue angle h of the green toner is 120° or more and 150° or less, and is, for example, preferably 128.5° or more and 144.5° or less, and more preferably 135° or more and 140° or less.

The fluorescent green toner according to the present exemplary embodiment is, for example, preferably a toner having a core/shell structure.

In the present exemplary embodiment, the coordinate values of the fluorescent green toner in the CIE1976 L*a*b* color system are measured by the following method.

The fluorescent green toner to be a sample is mixed with a carrier, and the mixture is put in a developing device of an image forming apparatus and used to form a solid image (an image having a density of 100%) on OS coated paper (manufactured by Oji Paper Co., Ltd., trade name: OS COAT 127) at a fixing temperature of 180° C. and a toner application amount of 4.0 $g/m^2$. By using a reflection spectrodensitometer X-Rite 939 (aperture size 4 mm, X-Rite Inc.), the coordinate values in the CIE1976 L*a*b* color system are measured at 10 random locations in the formed solid image, and the average of the L* values, a* values, and b* values is calculated.

There has been no colorant that shows a fluorescent green color as a single color. Therefore, in the related art, in many cases, a fluorescent yellow dye and a phthalocyanine pigment have been mixed together to adjust the color of a fluorescent green toner. However, using a dye as fluorescent yellow has a problem in that color migration occurs in a case where the toner comes into contact with a polyvinyl chloride product or the like containing a plasticizer.

On the other hand, in a case where a fluorescent yellow pigment is used in the fluorescent green toner, although color migration does not occur, the release agent seriously oozes out, which causes image roughening in a non-image history portion where the release agent of the previous image does not exist on a fixing belt. In a case where the surface of the image is rough, it is difficult for ultraviolet rays functioning as excitation light for the fluorescent toner to reach the pigment due to surface scattering, which makes the fluorescence intensity lower than fluorescence intensity in a portion where image roughening does not occur. The inventors of the present invention have found that as a result, the fluorescent toner makes it possible to confirm a marked gloss difference between a portion where image roughening occurs and a portion where image roughening does not occur.

The fluorescent green toner according to the present exemplary embodiment contains a binder resin, a release agent, a fluorescent pigment having a hydrophilic group, and a pigment having a halogen atom. Therefore, from the fluorescent green toner, an image excellent in gloss difference suppressiveness is obtained.

Presumably, using the green pigment having higher hydrophobicity due to the effect of a halogen atom in the pigment having a halogen atom may enhance the adhesion to the release agent which is also hydrophobic, the green pigment and the release agent may be thus dispersed in a state of adhering to each other, uneven distribution of the release agent may be thus suppressed, oozing of the release agent during fixing may be thus improved, and roughening of the surface of an image may be thus suppressed, which may suppress the gloss difference.

In the present exemplary embodiment, a fluorescent pigment refers to a pigment that emits light by light energy from the outside, and a non-fluorescent pigment refers to a pigment that does not emit light by light energy from the outside. Generally, a fluorescent pigment shows color by reflected light and light emission, and a non-fluorescent pigment shows color only by reflected light.

Hereinafter, the configuration of the fluorescent green toner according to the present exemplary embodiment will be specifically described.

Toner Particles

The toner particles contain a binder resin, a release agent, a fluorescent pigment having a hydrophilic group, and a pigment having a halogen atom and contain, as necessary, other additives.

Fluorescent Pigment Having Hydrophilic Group

The toner particles contain a fluorescent pigment having a hydrophilic group.

From the viewpoint of gloss difference suppressiveness, brightness, and chroma of the obtained image, the fluorescent pigment having a hydrophilic group is, for example, preferably a yellow fluorescent pigment.

In addition, from the viewpoint of gloss difference suppressiveness, brightness, and chroma of the obtained image, the fluorescent pigment having a hydrophilic group preferably has, for example, an emission peak in a wavelength region of 500 nm or more and 550 nm or less in an emission spectrum.

Examples of the hydrophilic group in the fluorescent pigment having a hydrophilic group include a hydroxy group, primary to tertiary amino groups, a carboxy group, a sulfo group, a phosphoric acid group, and the like.

Among these, from the viewpoint of gloss difference suppressiveness of the obtained image, the fluorescent pigment having a hydrophilic group preferably has, for example, a hydroxy group as the hydrophilic group.

Examples of the fluorescent pigment having a hydrophilic group include an azomethine compound, an isoindolinone compound, a xanthene compound (including a rhodamine compound, a fluorescein compound, and an eosin compound), a naphthalene compound, and a triarylmethane compound which have a hydrophilic group.

Among these, from the viewpoint of gloss difference suppressiveness of the obtained image, the fluorescent pigment having a hydrophilic group is preferably, for example, an azomethine compound, and more preferably a bisazomethine compound.

Examples of the azomethine compound include a compound having an azomethine structure represented by $—R^1C{=}N—$ ($R^1$ is a hydrogen atom or a monovalent substituent).

Examples of the bisazomethine compound include a compound having a bisazomethine structure represented by $-R^1C{=}N-N{=}CR^2-$ ($R^1$ and $R^2$ each independently represent a hydrogen atom or a monovalent substituent) in the molecular structure.

Examples of the fluorescent pigment having a hydrophilic group include the azomethine compounds (1) to (3).

Azomethine compound (1)

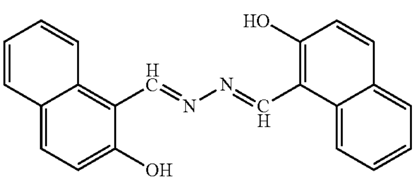

Azomethine compound (2)

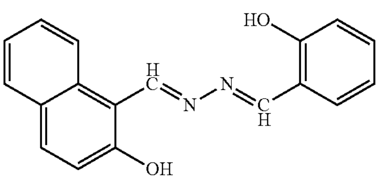

Azomethine compound (3)

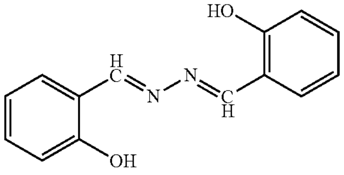

The emission peak wavelength of the azomethine compound (1) is 520 nm.

The emission peak wavelength of the azomethine compound (2) is 510 nm.

The emission peak wavelength of the azomethine compound (3) is 520 nm.

The fluorescent pigment having a hydrophilic group is, for example, preferably at least one kind of compound selected from the group consisting of the azomethine compound (1), the azomethine compound (2), and the azomethine compound (3).

As the fluorescent pigment having a hydrophilic group, for example, C.I. Pigment Yellow 101 is preferable. C.I. Pigment Yellow 101 is the azomethine compound (1).

From the viewpoint of gloss difference suppressiveness of the obtained image, the ratio of the molecular weight of the hydroxy group to the total molecular weight of one molecule of the fluorescent pigment having a hydrophilic group is, for example, preferably 20% by mass or less, more preferably 12% by mass or less, even more preferably more than 0% by mass and 12% by mass or less, and particularly preferably 5% by mass or more and 12% by mass or less.

In order that the dispersibility in the toner particles, color showing properties on a recording medium, fixing properties on a recording medium, and the like are achieved in well-balanced manner, a volume-average particle size D1 of the fluorescent pigment having a hydrophilic group is, for example, preferably 50 nm or more and 800 nm or less, more preferably 150 nm or more and 600 nm or less, and even more preferably 250 nm or more and 400 nm or less.

The volume-average particle size of the pigment is measured using a laser diffraction-type particle size distribution analyzer (for example, LA-700 manufactured by Horiba, Ltd.) by dispersing the pigment in an aqueous solution of a surfactant. The volume-based particle size distribution is plotted from the small particle size, and the particle size at which the cumulative percentage of the particles reaches 50% is adopted as the volume-average particle size.

The toner particles may contain one kind of fluorescent pigment having a hydrophilic group alone or two or more kinds of fluorescent pigments having a hydrophilic group. From the viewpoint of brightness and chroma of the obtained image, for example, it is preferable that the toner particles contain one kind of fluorescent pigment having a hydrophilic group alone.

From the viewpoint of gloss difference suppressiveness, brightness, and chroma of the obtained image, the content of the fluorescent pigment having a hydrophilic group with respect to the total amount of the toner particles is, for example, preferably 0.1% by mass or more and 30% by mass or less, more preferably 0.5% by mass or more and 25% by mass or less, even more preferably 1% by mass or more and 20% by mass or less, and particularly preferably 5% by mass or more and 15% by mass or less.

Furthermore, from the viewpoint of gloss difference suppressiveness of the obtained image, for example, it is preferable that the content of the fluorescent pigment having a hydrophilic group be higher than the content of the pigment having a halogen atom.

Pigment Having Halogen Atom

The toner particles contain a pigment having a halogen atom.

From the viewpoint of gloss difference suppressiveness, brightness, and chroma of the obtained image, the pigment having a halogen atom is, for example, preferably a non-fluorescent pigment, and more preferably a non-fluorescent green pigment.

In addition, from the viewpoint of gloss difference suppressiveness, brightness, and chroma of the obtained image, the pigment having a halogen atom preferably has, for example, a reflection peak in a wavelength region of 480 nm or more and 540 nm or less in a reflection spectrum.

Examples of the halogen atom in the pigment having a halogen atom include a fluorine atom, a chlorine atom, a bromine atom, and an iodine atom.

From the viewpoint of gloss difference suppressiveness of the obtained image, for example, the pigment having a halogen atom preferably has at least one kind of atom selected from the group consisting of a chlorine atom and a bromine atom as the halogen atom among the above, and more preferably has a chlorine atom and a bromine atom as the halogen atom.

In addition, from the viewpoint of gloss difference suppressiveness of the obtained image, for example, the pigment having a halogen atom preferably has two or more halogen atoms, more preferably has four or more halogen atoms, even more preferably has 6 or more halogen atoms, and particularly preferable has 8 or more and 32 or less halogen atoms.

Examples of the pigment having a halogen atom include a halogenated phthalocyanine compound and a lake pigment of a halogenated triphenylmethane dye.

As the pigment having a halogen atom, for example, a halogenated phthalocyanine compound is preferable, and at least one kind of compound selected from the group consisting of halogenated copper phthalocyanine and halogenated zinc phthalocyanine is more preferable.

Examples of the halogenated copper phthalocyanine include C.I. Pigment Green 7 (hue: bluish green, having 15 chlorine atoms), C.I. Pigment Green 36 (hue: yellowish green, having 10 chlorine atoms and 6 bromine atoms), and C.I. Pigment Blue 76 (hue: blue, having 8 to 12 chlorine atoms).

Examples of the halogenated zinc phthalocyanine include C.I. Pigment Green 58 (hue: green, having 3 chlorine atoms and 13 bromine atoms) and C.I. Pigment green 59 (hue: green, having 0 to 16 chlorine atoms and 0 to 16 bromine atoms).

The pigment having a halogen atom is, for example, even more preferably at least one kind of pigment selected from the group consisting of C.I. Pigment Green 7, C.I. Pigment Green 36, C.I. Pigment Green 58, C.I. Pigment Green 59, and C.I. Pigment Blue 76.

In order that the dispersibility in the toner particles, color showing properties on a recording medium, fixing properties on a recording medium, and the like are achieved in well-balanced manner, a volume-average particle size D2 of the pigment having a halogen atom is, for example, preferably 50 nm or more and 300 nm or less, more preferably 100 nm or more and 250 nm or less, and even more preferably 120 nm or more and 200 nm or less.

The toner particles may contain one kind of pigment having a halogen atom alone or two or more kinds of pigments having a halogen atom.

From the viewpoint of gloss difference suppressiveness, brightness, and chroma of the obtained image, the content of the pigment having a halogen atom with respect to the total amount of the toner particles is, for example, preferably 0.1% by mass or more and 30% by mass or less, more preferably 0.2% by mass or more and 20% by mass or less, even more preferably 0.5% by mass or more and 20% by mass or less, and particularly preferably 1% by mass or more and 15% by mass or less.

Furthermore, from the viewpoint of gloss difference suppressiveness of the obtained image, for example, it is preferable that the content of the fluorescent pigment having a hydrophilic group be higher than the content of the pigment having a halogen atom.

From the viewpoint of increasing the brightness and chroma of the obtained image, a ratio D1/D2 of the volume-average particle size D1 of the fluorescent pigment having a hydrophilic group to the volume-average particle size D2 of the pigment having a halogen atom is, for example, preferably 1 or more and 3 or less, more preferably 1.2 or more and 2.5 or less, and even more preferably 1.5 or more and 2 or less.

In the toner particles, from the viewpoint of increasing the brightness and chroma of the obtained image, a mass-based ratio M2/M1 of a content M2 of the pigment having a halogen atom to a content M1 of the fluorescent pigment having a hydrophilic group is, for example, preferably 0.05 or more and 1.5 or less.

From the viewpoint of increasing the chroma of the obtained image, the ratio M2/M1 is 0.05 or more, for example, preferably 0.1 or more, and more preferably 0.3 or more.

From the viewpoint of increasing the brightness of the obtained image, the ratio M2/M1 is 1.5 or less, for example, preferably 1.0 or less, more preferably less than 1.0, and even more preferably 0.8 or less.

In the toner particles, the total content of the fluorescent pigment having a hydrophilic group and the pigment having a halogen atom with respect to the total amount of the toner particles is, for example, preferably 5% by mass or more and 20% by mass or less.

From the viewpoint of increasing the chroma of the obtained image, the total content of the two pigments is 5% by mass or more, for example, preferably 8% by mass or more, and more preferably 10% by mass or more.

From the viewpoint of increasing the brightness of the obtained image, the total content of the two pigments is, for example, preferably 18% by mass or less, and more preferably 15% by mass or less.

From the viewpoint of increasing the brightness and chroma of the obtained image, the wavelength difference between the emission peak of the fluorescent pigment having a hydrophilic group making up the highest content among the fluorescent pigments having a hydrophilic group contained in the toner particles and the reflection peak of the pigment having a halogen atom making up the highest content among the pigments having a halogen atom contained in the green toner particles is, for example, preferably 40 nm or less, more preferably 30 nm or less, even more preferably 20 nm or less, particularly preferably 10 nm or less, and most preferably 0 nm.

The toner particles may contain other colorants in addition to the fluorescent pigment having a hydrophilic group and the pigment having a halogen atom.

The total content of the fluorescent pigment having a hydrophilic group and the pigment having a halogen atom with respect to the total amount of colorants contained in the toner particles is, for example, preferably 90% by mass or more, more preferably 95% by mass or more, and even more preferably 100% by mass.

Binder Resin

Examples of the binder resin include vinyl-based resins consisting of a homopolymer of a monomer, such as styrenes (for example, styrene, p-chlorostyrene, α-methylstyrene, and the like), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate, and the like), ethylenically unsaturated nitriles (for example, acrylonitrile, methacrylonitrile, and the like), vinyl ethers (for example, vinyl methyl ether, vinyl isobutyl ether, and the like), vinyl ketones (for example, vinyl methyl ketone, vinyl ethyl ketone, vinyl isopropenyl ketone, and the like), olefins (for example, ethylene, propylene, butadiene, and the like), or a copolymer obtained by combining two or more kinds of monomers described above.

Examples of the binder resin include non-vinyl-based resins such as an epoxy resin, a polyester resin, a polyurethane resin, a polyamide resin, a cellulose resin, a polyether resin, and modified rosin, mixtures of these with the vinyl-based resins, or graft polymers obtained by polymerizing a vinyl-based monomer together with the above resins.

One kind of each of these binder resins may be used alone, or two or more kinds of these binder resins may be used in combination.

As the binder resin, for example, a polyester resin is preferable.

Examples of the polyester resin include known polyester resins.

Examples of the polyester resin include a polycondensate of a polyvalent carboxylic acid and a polyhydric alcohol. As the polyester resin, a commercially available product or a synthetic resin may be used.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, sebacic acid, and the like), alicyclic dicarboxylic acid (for example, cyclohexanedicarboxylic acid and the like), aromatic dicarboxylic acids (for example, terephthalic acid, isophthalic acid, phthalic acid, naphthalenedicarboxylic acid, and the like), anhydrides of these, and lower alkyl esters (for example, having 1 or more and 5 or less carbon atoms). Among these, for example, aromatic dicarboxylic acids are preferable as the polyvalent carboxylic acid.

As the polyvalent carboxylic acid, a carboxylic acid having a valency of 3 or more that has a crosslinked structure or a branched structure may be used in combination with a dicarboxylic acid. Examples of the carboxylic acid having a valency of 3 or more include trimellitic acid, pyromellitic acid, anhydrides of these, lower alkyl esters (for example, having 1 or more and 5 or less carbon atoms) of these, and the like.

One kind of polyvalent carboxylic acid may be used alone, or two or more kinds of polyvalent carboxylic acids may be used in combination.

Examples of the polyhydric alcohol include aliphatic diols (for example, ethylene glycol, diethylene glycol, triethylene glycol, propylene glycol, butanediol, hexanediol, neopentyl glycol, and the like), alicyclic diols (for example, cyclohexanediol, cyclohexanedimethanol, hydrogenated bisphenol A, and the like), and aromatic diols (for example, an ethylene oxide adduct of bisphenol A, a propylene oxide adduct of bisphenol A, and the like). Among these, for example, aromatic diols and alicyclic diols are preferable as the polyhydric alcohol, and aromatic diols are more preferable.

As the polyhydric alcohol, a polyhydric alcohol having three or more hydroxyl groups and a crosslinked structure or a branched structure may be used in combination with a diol. Examples of the polyhydric alcohol having three or more hydroxyl groups include glycerin, trimethylolpropane, and pentaerythritol.

One kind of polyhydric alcohol may be used alone, or two or more kinds of polyhydric alcohols may be used in combination.

The glass transition temperature (Tg) of the polyester resin is, for example, preferably 50° C. or higher and 80° C. or lower, and more preferably 50° C. or higher and 65° C. or lower.

The glass transition temperature is determined from a DSC curve obtained by differential scanning calorimetry (DSC). More specifically, the glass transition temperature is determined by “extrapolated glass transition onset temperature” described in the method for determining a glass transition temperature in JIS K7121-1987, “Testing methods for transition temperatures of plastics”.

The weight-average molecular weight (Mw) of the polyester resin is, for example, preferably 5,000 or more and 1,000,000 or less, and more preferably 7,000 or more and 500,000 or less.

The number-average molecular weight (Mn) of the polyester resin is, for example, preferably 2,000 or more and 100,000 or less.

The molecular weight distribution Mw/Mn of the polyester resin is, for example, preferably 1.5 or more and 100 or less, and more preferably 2 or more and 60 or less.

The weight-average molecular weight and the number-average molecular weight are measured by gel permeation chromatography (GPC). By GPC, the molecular weight is measured using GPC·HCL-8120GPC manufactured by Tosoh Corporation as a measurement device, TSKgel Super HM-M (15 cm) manufactured by Tosoh Corporation as a column, and THF as a solvent. The weight-average molecular weight and the number-average molecular weight are calculated using a molecular weight calibration curve plotted using a monodisperse polystyrene standard sample from the measurement results.

The polyester resin is obtained by a known manufacturing method. Specifically, for example, the polyester resin is obtained by a method of setting a polymerization temperature to 180° C. or higher and 230° C. or lower, reducing the internal pressure of a reaction system as necessary, and carrying out a reaction while removing water or an alcohol generated during condensation.

In a case where monomers as raw materials are not dissolved or compatible at the reaction temperature, in order to dissolve the monomers, a solvent having a high boiling point may be added as a solubilizer. In this case, a polycondensation reaction is carried out in a state where the solubilizer is being distilled off. In a case where a monomer with poor compatibility takes part in the reaction, for example, the monomer with poor compatibility may be condensed in advance with an acid or an alcohol that is to be polycondensed with the monomer, and then polycondensed with the major component.

The content of the binder resin with respect to the total amount of the toner particles is, for example, preferably 40% by mass or more and 95% by mass or less, more preferably 50% by mass or more and 90% by mass or less, and even more preferably 60% by mass or more and 85% by mass or less.

Release Agent

Examples of the release agent include hydrocarbon-based wax; natural wax such as carnauba wax, rice wax, and candelilla wax; synthetic or mineral·petroleum-based wax such as montan wax; ester-based wax such as fatty acid esters and montanic acid esters; and the like. The release agent is not limited to these.

Among the above, from the viewpoint of gloss difference suppressiveness of the obtained image, for example, hydrocarbon-based wax is preferable, and paraffin wax or polyethylene wax is more preferable.

The melting temperature of the release agent is, for example, preferably 50° C. or higher and 110° C. or lower, and more preferably 60° C. or higher and 100° C. or lower.

The melting temperature is determined from a DSC curve obtained by differential scanning calorimetry (DSC) by “peak melting temperature” described in the method for determining the melting temperature in JIS K 7121-1987, “Testing methods for transition temperatures of plastics”.

From the viewpoint of gloss difference suppressiveness of the obtained image, the domain diameter of the release agent in the toner particles is, for example, preferably equal to or less than 40% of the particle size of the toner particles, more preferably equal to or less than 25% of the particle size of the toner particles, and particularly preferably equal to or more than 5% and equal to or less than 15% of the particle size of the toner particles.

Hereinafter, a method of measuring the domain diameter of the release agent will be described.

The domain diameter of the release agent is determined by observing a cross section of the toner.

The cross section of the toner particles is observed by the following method.

Toner particles (or toner particles to which an external additive has adhered) are mixed with and embedded in an epoxy resin, and the epoxy resin is solidified. The obtained solidified substance is cut with an ultramicrotome device (UltracutUCT manufactured by Leica Microsystems), thereby preparing a thin sample having a thickness of 80 nm or more and 130 nm or less. Then, the obtained thin sample is stained with ruthenium tetroxide in a desiccator at 30° C. for 3 hours. Thereafter, by using an ultra-high resolution field emission scanning electron microscope (FE-SEM, S-4800 manufactured by Hitachi High-Tech Corporation), a STEM observation image (acceleration voltage: 30 kV, magnification: 20,000×) of the stained thin sample in a transmission image mode is obtained.

In each of the toner particles, based on contrast and shape, a binder resin (a crystalline resin and an amorphous resin) and a release agent are determined. In the STEM observation image, because the binder resin other than the release agent has many double bond portions and is stained with ruthenium tetroxide, the release agent portion and the resin portion other than the release agent are differentiated. More specifically, the ruthenium staining makes the release agent have the brightest color, the crystalline resin (for example, a crystalline polyester resin) have the second brightest color, and the amorphous resin (for example, an amorphous polyester resin) have the darkest color. By contrast adjustment, the release agent appears white, the amorphous resin appears black, and the crystalline resin appears light gray. In this way, the domain of the release agent is determined.

The domain diameter of the release agent is determined by the following method.

First, using the STEM observation image, domains of the release agent having a domain of 0.5 μm or more per one toner particle are extracted, the maximum diameters of the domains are determined, and an arithmetic mean thereof is calculated. The same operation is performed on 100 toner particles, and an arithmetic mean of the maximum diameters of the domains is calculated for the 100 toner particles and adopted as "domain diameter of the release agent".

The content of the release agent with respect to the total mass of the toner particles is, for example, preferably 1% by mass or more and 20% by mass or less, more preferably 2% by mass or more and 20% by mass or less, and even more preferably 3% by mass or more and 15% by mass or less.

Other Additives

Examples of other additives include known additives such as a magnetic material, a charge control agent, and inorganic powder. These additives are incorporated into the toner particles as internal additives.

Characteristics of Toner Particles and the Like

The toner particles may be toner particles that have a single-layer structure or toner particles having a so-called core/shell structure that is configured with a core portion (core particle) and a coating layer (shell layer) covering the core portion.

The toner particles having a core/shell structure may, for example, be configured with a core portion that is configured with a binder resin and other additives used as necessary, such as a colorant and a release agent, and a coating layer that is configured with a binder resin.

The volume-average particle size (D50v) of the toner particles is, for example, preferably 2 μm or more and 10 μm or less, and more preferably 4 μm or more and 8 μm or less.

The various average particle sizes and various particle size distribution indexes of the toner particles are measured using COULTER MULTISIZER II (manufactured by Beckman Coulter Inc.) and using ISOTON-II (manufactured by Beckman Coulter Inc.) as an electrolytic solution.

For measurement, a measurement sample in an amount of 0.5 mg or more and 50 mg or less is added to 2 ml of a 5% by mass aqueous solution of a surfactant (for example, preferably sodium alkylbenzene sulfonate) as a dispersant. The obtained solution is added to an electrolytic solution in a volume of 100 ml or more and 150 ml or less.

The electrolytic solution in which the sample is suspended is subjected to a dispersion treatment for 1 minute with an ultrasonic disperser, and the particle size distribution of particles having a particle size in a range of 2 μm or more and 60 μm or less is measured using COULTER MULTISIZER II with an aperture having an aperture size of 100 μm. The number of particles to be sampled is 50,000.

For the particle size range (channel) divided based on the measured particle size distribution, a cumulative volume distribution and a cumulative number distribution are plotted from small-sized particles. The particle size at which the cumulative percentage of particles is 16% is defined as volume-based particle size D16v and a number-based particle size D16p. The particle size at which the cumulative percentage of particles is 50% is defined as volume-average particle size D50v and a cumulative number-average particle size D50p. The particle size at which the cumulative percentage of particles is 84% is defined as volume-based particle size D84v and a number-based particle size D84p.

By using these, a volume-average particle size distribution index (GSDv) is calculated as $(D84v/D16v)^{1/2}$, and a number-average particle size distribution index (GSDp) is calculated as $(D84p/D16p)^{1/2}$.

The average circularity of the toner particles is, for example, preferably 0.94 or more and 1.00 or less, and more preferably 0.95 or more and 0.98 or less.

The average circularity of the toner particles is determined by (circular equivalent perimeter)/(perimeter) [(perimeter of circle having the same projected area as particle image)/(perimeter of projected particle image)]. Specifically, the average circularity is a value measured by the following method.

First, toner particles as a measurement target are collected by suction, and a flat flow of the particles is formed. Then, an instant flash of strobe light is emitted to the particles, and the particles are imaged as a still image. By using a flow-type particle image analyzer (FPIA-3000 manufactured by Sysmex Corporation) performing image analysis on the particle image, the average circularity is determined. The number of samplings for determining the average circularity is 3,500.

In a case where a toner contains external additives, the toner (developer) as a measurement target is dispersed in water containing a surfactant, then the dispersion is treated with ultrasonic waves such that the external additives are removed, and the toner particles are collected.

External Additive

Examples of the external additives include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO{\cdot}SiO_2$, $K_2O{\cdot}(TiO_2)_n$, $Al_2O_3{\cdot}2SiO_2$, $CaCO_3$, $MgCO_3$, $BaSO_4$, $MgSO_4$, and the like.

The surface of the inorganic particles as an external additive may have undergone, for example, a hydrophobic treatment. The hydrophobic treatment is performed, for example, by immersing the inorganic particles in a hydrophobic agent. The hydrophobic agent is not particularly limited, and examples thereof include a silane-based coupling agent, silicone oil, a titanate-based coupling agent, an aluminum-based coupling agent, and the like. One kind of each of these agents may be used alone, or two or more kinds of these agents may be used in combination.

Usually, the amount of the hydrophobic agent is, for example, 1 part by mass or more and 10 parts by mass or less with respect to 100 parts by mass of the inorganic particles.

Examples of external additives also include resin particles (resin particles such as polystyrene, polymethylmethacrylate, and melamine resins), a cleaning activator (for example, a metal salt of a higher fatty acid represented by zinc stearate or fluorine-based polymer particles), and the like.

The amount of the external additives added to the exterior of the toner particles with respect to the toner particles is, for example, preferably 0.01% by mass or more and 5% by mass or less, and more preferably 0.01% by mass or more and 2.0% by mass or less.

It is preferable that the solid image formed on coated paper by using the fluorescent green toner according to the present exemplary embodiment have, for example, a reflectance of 70% or more at the reflection peak in a spectral reflection spectrum.

Manufacturing Method of Fluorescent Green Toner

The fluorescent green toner according to the present exemplary embodiment is obtained by manufacturing toner particles and then adding external additives to the exterior of the toner particles.

The toner particles may be manufactured by any of a dry manufacturing method (for example, a kneading and pulverizing method or the like) or a wet manufacturing method (for example, an aggregation and coalescence method, a suspension polymerization method, a dissolution suspension method, or the like). There are no particular restrictions on these manufacturing methods, and known manufacturing methods are adopted. Among the above methods, for example, the aggregation and coalescence method may be used for obtaining toner particles.

In a case where the toner particles are manufactured by the aggregation and coalescence method, for example, the following manufacturing method is preferable.

A manufacturing method having a step of preparing a resin particle dispersion in which resin particles to be a binder resin are dispersed (a resin particle dispersion-preparing step);

- a step of preparing a dispersion of a fluorescent pigment having a hydrophilic group in which a fluorescent pigment having a hydrophilic group is dispersed (a step of preparing a dispersion of a fluorescent pigment having a hydrophilic group);
- a step of preparing a dispersion of a pigment having a halogen atom in which a pigment having a halogen atom is dispersed (a step of preparing a dispersion of a pigment having a halogen atom);
- a step of forming aggregated particles by aggregating mixed particles in a mixed dispersion obtained by mixing together the resin particle dispersion, the dispersion of a fluorescent pigment having a hydrophilic group, and the dispersion of a pigment having a halogen atom (aggregated particle-forming step); and
- a step of coalescing the aggregated particles by heating an aggregated particle dispersion, in which the aggregated particles are dispersed, to form green toner particles (coalescence step).

Hereinafter, each of the steps will be specifically described.

Resin Particle Dispersion-Preparing Step

The resin particle dispersion is prepared, for example, by dispersing the resin particles in a dispersion medium by using a surfactant.

Examples of the dispersion medium used for the resin particle dispersion include an aqueous medium.

Examples of the aqueous medium include distilled water, water such as deionized water, alcohols, and the like. One kind of each of these media may be used alone, or two or more kinds of these media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, for example, an anionic surfactant and a cationic surfactant are particularly preferable. The nonionic surfactant may be used in combination with an anionic surfactant or a cationic surfactant.

One kind of surfactant may be used alone, or two or more kinds of surfactants may be used in combination.

As for the resin particle dispersion, examples of the method for dispersing resin particles in the dispersion medium include general dispersion methods such as a rotary shearing homogenizer, a ball mill having media, a sand mill, and a dyno mill. Depending on the type of resin particles, the resin particles may be dispersed in the dispersion medium by using a transitional phase inversion emulsification method. The transitional phase inversion emulsification method is a method of dissolving a resin to be dispersed in a hydrophobic organic solvent in which the resin is soluble, adding a base to an organic continuous phase (O phase) for causing neutralization, and then adding an aqueous medium (W phase), such that the resin undergoes phase transition from W/O to O/W and is dispersed in the aqueous medium in the form of particles.

The volume-average particle size of the resin particles dispersed in the resin particle dispersion is, for example, preferably 0.01 μm or more and 1 μm or less, more preferably 0.08 μm or more and 0.8 μm or less, and even more preferably 0.1 μm or more and 0.6 μm or less. For determining the volume-average particle size of the resin particles, a particle size distribution is measured using a laser diffraction-type particle size distribution analyzer (for example, LA-700 manufactured by HORIBA, Ltd.), a volume-based cumulative distribution from small-sized particles is drawn for the particle size range (channel) divided using the particle size distribution, and the particle size of particles accounting for cumulative 50% of all particles is measured as a volume-average particle size D50v. For particles in other dispersions, the volume-average particle size is measured in the same manner.

The content of the resin particles contained in the resin particle dispersion is, for example, preferably 5% by mass or more and 50% by mass or less, and more preferably 10% by mass or more and 40% by mass or less.

The method of preparing a release agent particle dispersion is the same as the method of preparing the resin particle dispersion. The content of the release agent particles contained in the release agent particle dispersion is, for example, preferably 5% by mass or more and 50% by mass or less, and more preferably 10% by mass or more and 40% by mass or less.

Step of Preparing Dispersion of Fluorescent Pigment Having Hydrophilic Group

The dispersion of a fluorescent pigment having a hydrophilic group is prepared, for example, by dispersing the fluorescent pigment having a hydrophilic group in a dispersion medium by using a surfactant.

Examples of the dispersion medium used for the dispersion of a fluorescent pigment having a hydrophilic group include an aqueous medium.

Examples of the aqueous medium include distilled water, water such as deionized water, alcohols, and the like. One kind of each of these media may be used alone, or two or more kinds of these media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, for example, an anionic surfactant and a cationic surfactant are particularly preferable. The nonionic surfactant may be used in combination with an anionic surfactant or a cationic surfactant.

One kind of surfactant may be used alone, or two or more kinds of surfactants may be used in combination.

Examples of the method of dispersing the fluorescent pigment having a hydrophilic group in a dispersion medium include dispersion methods using a rotary shearing homogenizer, a ball mill having media, a sand mill, a dyno mill, a key mill, and the like.

The volume-average particle size of the fluorescent pigment having a hydrophilic group to be dispersed in the dispersion of a fluorescent pigment having a hydrophilic group is, for example, preferably 50 nm or more and 800 nm or less, more preferably 150 nm or more and 600 nm or less, and even more preferably 250 nm or more and 400 nm or less. The particle size of the fluorescent pigment having a hydrophilic group can be adjusted, for example, by the method and time of the dispersion treatment.

The content of the fluorescent pigment having a hydrophilic group contained in the dispersion of a fluorescent pigment having a hydrophilic group is, for example, preferably 5% by mass or more and 50% by mass or less, and more preferably 10% by mass or more and 40% by mass or less.

Step of Preparing Dispersion of Pigment Having Halogen Atom

The dispersion of a pigment having a halogen atom is prepared, for example, by dispersing the pigment having a halogen atom in a dispersion medium by using a surfactant.

Examples of the dispersion medium used for the dispersion of a pigment having a halogen atom include an aqueous medium.

Examples of the aqueous medium include distilled water, water such as deionized water, alcohols, and the like. One kind of each of these media may be used alone, or two or more kinds of these media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, for example, an anionic surfactant and a cationic surfactant are particularly preferable. The nonionic surfactant may be used in combination with an anionic surfactant or a cationic surfactant.

One kind of surfactant may be used alone, or two or more kinds of surfactants may be used in combination.

Examples of the method of dispersing the pigment having a halogen atom in a dispersion medium include dispersion methods using a rotary shearing homogenizer, a ball mill having media, a sand mill, a dyno mill, a key mill, and the like.

The volume-average particle size of the pigment having a halogen atom to be dispersed in the dispersion of a pigment having a halogen atom is, for example, preferably 50 nm or more and 300 nm or less, more preferably 100 nm or more and 250 nm or less, and even more preferably 120 nm or more and 200 nm or less. The particle size of the pigment having a halogen atom can be adjusted, for example, by the method and time of the dispersion treatment.

The content of the pigment having a halogen atom contained in the dispersion of a pigment having a halogen atom is, for example, preferably 5% by mass or more and 50% by mass or less, and more preferably 10% by mass or more and 40% by mass or less.

Aggregated Particle-Forming Step

The resin particle dispersion, the dispersion of a fluorescent pigment having a hydrophilic group, the dispersion of a pigment having a halogen atom, and the release agent particle dispersion are mixed together. Then, in the mixed dispersion, the resin particles, the fluorescent pigment having a hydrophilic group, the pigment having a halogen atom, and the release agent particles are hetero-aggregated such that aggregated particles are formed which have a diameter close to the diameter of the target toner particles and include the resin particles, the fluorescent pigment having a hydrophilic group, the pigment having a halogen atom, and the release agent particles.

Specifically, for example, an aggregating agent is added to the mixed dispersion, the pH of the mixed dispersion is adjusted such that the dispersion is acidic (for example, pH of 2 or higher and 5 or lower), and a dispersion stabilizer is added thereto as necessary. Then, the dispersion is heated to a temperature close to the glass transition temperature of the resin particles (specifically, for example, to a temperature equal to or higher than the glass transition temperature of the resin particles—30° C. and equal to or lower than the glass transition temperature of the resin particles—10° C.) such that the particles dispersed in the mixed dispersion are aggregated, thereby forming aggregated particles.

In the aggregated particle-forming step, for example, in a state where the mixed dispersion is being stirred with a rotary shearing homogenizer, an aggregating agent may be added thereto at room temperature (for example, 25° C.), the pH of the mixed dispersion may be adjusted such that the dispersion is acidic (for example, pH of 2 or higher and 5 or lower), a dispersion stabilizer may be added to the dispersion as necessary, and then the dispersion may be heated.

Examples of the aggregating agent include a surfactant having polarity opposite to the polarity of the surfactant contained in the mixed dispersion, an inorganic metal salt, and a metal complex having a valency of 2 or higher. In a case where a metal complex is used as the aggregating agent, the amount of the surfactant used is reduced, and the charging characteristics are improved.

In addition to the aggregating agent, an additive that forms a complex or a bond similar to the complex with a metal ion of the aggregating agent may be used as necessary. As such an additive, a chelating agent is used.

Examples of the inorganic metal salt include metal salts such as calcium chloride, calcium nitrate, barium chloride, magnesium chloride, zinc chloride, aluminum chloride, and aluminum sulfate; inorganic metal salt polymers such as polyaluminum chloride, polyaluminum hydroxide, and calcium polysulfide; and the like.

As the chelating agent, a water-soluble chelating agent may also be used. Examples of the chelating agent include oxycarboxylic acids such as tartaric acid, citric acid, and gluconic acid; aminocarboxylic acids such as iminodiacetic acid (IDA), nitrilotriacetic acid (NTA), and ethylenediaminetetraacetic acid (EDTA); and the like.

The amount of the chelating agent added with respect to 100 parts by mass of resin particles is, for example, preferably 0.01 parts by mass or more and 5.0 parts by mass or less, and more preferably 0.1 parts by mass or more and less than 3.0 parts by mass.

Coalescence Step

The aggregated particle dispersion in which the aggregated particles are dispersed is then heated to, for example, a temperature equal to or higher than the glass transition temperature of the resin particles (for example, a temperature higher than the glass transition temperature of the resin particles by 10° C. to 30° C.) such that the aggregated particles coalesce, thereby forming toner particles.

Toner particles are obtained through the above steps.

The toner particles may be manufactured through a step of obtaining an aggregated particle dispersion in which the aggregated particles are dispersed, then mixing the aggregated particle dispersion with a resin particle dispersion in which resin particles are dispersed to cause the resin particles to be aggregated and adhere to the surface of the aggregated particles and to form second aggregated particles, and a step of heating a second aggregated particle dispersion in which the second aggregated particles are dispersed to cause the second aggregated particles to coalesce and to form toner particles having a core/shell structure.

After the coalescence step ends, the toner particles in the dispersion are subjected to known washing step, solid-liquid separation step, and drying step, thereby obtaining dry toner particles. As the washing step, from the viewpoint of charging properties, for example, displacement washing may be thoroughly performed using deionized water. As the solid-liquid separation step, from the viewpoint of productivity, for example, suction filtration, pressure filtration, or the like may be performed. As the drying step, from the viewpoint of productivity, for example, freeze-drying, flush drying, fluidized drying, vibratory fluidized drying, or the like may be performed.

For example, by adding an external additive to the obtained dry toner particles and mixing together the external additive and the toner particles, the toner according to the present exemplary embodiment is manufactured. The mixing may be performed, for example, using a V blender, a Henschel mixer, a Lödige mixer, or the like. Furthermore, coarse particles of the toner may be removed as necessary by using a vibratory sieving machine, a pneumatic sieving machine, or the like.

Electrostatic Charge Image Developer

The electrostatic charge image developer according to the present exemplary embodiment contains at least the green toner according to the present exemplary embodiment.

The electrostatic charge image developer according to the present exemplary embodiment may be a one-component developer which contains only the green toner according to the present exemplary embodiment or a two-component developer which is obtained by mixing together the green toner and a carrier.

The carrier is not particularly limited, and examples thereof include known carriers. Examples of the carrier include a coated carrier obtained by coating the surface of a core material consisting of magnetic powder with a resin; a magnetic powder dispersion-type carrier obtained by dispersing and mixing magnetic powder in a matrix resin and; a resin impregnation-type carrier obtained by impregnating porous magnetic powder with a resin; and the like.

Each of the magnetic powder dispersion-type carrier and the resin impregnation-type carrier may be a carrier obtained by coating the surface of a core material, which is particles configuring the carrier, with a resin.

Examples of the magnetic powder include magnetic metals such as iron, nickel, and cobalt; magnetic oxides such as ferrite and magnetite; and the like.

Examples of the coating resin and matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin configured with an organosiloxane bond, a product obtained by modifying the straight silicone resin, a fluororesin, polyester, polycarbonate, a phenol resin, an epoxy resin, and the like. The coating resin and the matrix resin may contain other additives such as conductive particles. Examples of the conductive particles include metals such as gold, silver, and copper, and particles such as carbon black, titanium oxide, zinc oxide, tin oxide, barium sulfate, aluminum borate, and potassium titanate.

The surface of the core material is coated with a resin, for example, by a coating method using a solution for forming a coating layer obtained by dissolving the coating resin and various additives (used as necessary) in an appropriate solvent, and the like. The solvent is not particularly limited, and may be selected in consideration of the type of the resin used, coating suitability, and the like.

Specifically, examples of the resin coating method include an immersion method of immersing the core material in the solution for forming a coating layer; a spray method of spraying the solution for forming a coating layer to the surface of the core material; a fluidized bed method of spraying the solution for forming a coating layer to the core material that is floating by an air flow; a kneader coater method of mixing the core material of the carrier with the solution for forming a coating layer in a kneader coater and then removing solvents; and the like.

The mixing ratio (mass ratio) between the green toner and the carrier, represented by green toner:carrier, in the two-component developer is, for example, preferably 1:100 to 30:100, and more preferably 3:100 to 20:100.

Image Forming Apparatus and Image Forming Method

The image forming apparatus and image forming method according to the present exemplary embodiment will be described.

The image forming apparatus according to the present exemplary embodiment includes an image holder, a charging unit that charges the surface of the image holder, an electrostatic charge image forming unit that forms an electrostatic charge image on the charged surface of the image holder, a developing unit that contains an electrostatic charge image developer and develops the electrostatic charge image formed on the surface of the image holder as a toner image by using the electrostatic charge image developer, a transfer unit that transfers the toner image formed on the surface of the image holder to the surface of a recording medium, and a fixing unit that fixes the toner image transferred to the surface of the recording medium. As the electrostatic charge image developer, the electrostatic charge image developer according to the present exemplary embodiment is used.

In the image forming apparatus according to the present exemplary embodiment, an image forming method (image forming method according to the present exemplary embodiment) is performed which has a charging step of charging the surface of the image holder, an electrostatic charge image forming step of forming an electrostatic charge image on the charged surface of the image holder, a developing step of developing the electrostatic charge image formed on the surface of the image holder as a toner image by using the electrostatic charge image developer according to the present exemplary embodiment, a transfer step of transferring the toner image formed on the surface of the image holder to the surface of a recording medium, and a fixing step of fixing the toner image transferred to the surface of the recording medium.

As the image forming apparatus according to the present exemplary embodiment, known image forming apparatuses are used, such as a direct transfer-type apparatus that transfers a toner image formed on the surface of the image holder directly to a recording medium; an intermediate transfer-type apparatus that performs primary transfer by which the toner image formed on the surface of the image holder is transferred to the surface of an intermediate transfer member and secondary transfer by which the toner image transferred to the surface of the intermediate transfer member is transferred to the surface of a recording medium; an apparatus including a cleaning unit that cleans the surface of the image holder before charging after the transfer of the toner image; and an apparatus including a charge neutralizing unit that neutralizes charge by irradiating the surface of the image holder with charge neutralizing light before charging after the transfer of the toner image.

In a case where the image forming apparatus according to the present exemplary embodiment is the intermediate transfer-type apparatus, as the transfer unit, for example, a configuration is adopted which has an intermediate transfer member with a surface on which the toner image will be transferred, a primary transfer unit that performs primary transfer to transfer the toner image formed on the surface of the image holder to the surface of the intermediate transfer member, and a secondary transfer unit that performs secondary transfer to transfer the toner image transferred to the surface of the intermediate transfer member to the surface of a recording medium.

In the image forming apparatus according to the present exemplary embodiment, for example, a portion including the developing unit may be a cartridge structure (process cartridge) detachable from the image forming apparatus. As the process cartridge, for example, a process cartridge is suitably used which includes a developing unit that contains the electrostatic charge image developer according to the present exemplary embodiment.

An example of the image forming apparatus according to the present exemplary embodiment will be shown below, but the present invention is not limited thereto. Hereinafter, among the parts shown in the drawing, main parts will be described, and others will not be described.

In the following section, as an example of the image forming apparatus according to the present exemplary embodiment, a 6-unit tandem image forming apparatus having an array of 6 image forming units will be described. The tandem image forming apparatus is not limited to this, and may be a 5-unit tandem image forming apparatus having an array of 5 image forming units, a 4-unit tandem image forming apparatus having an array of 4 image forming units, or the like.

FIG. 1 is a view schematically showing the configuration of the image forming apparatus according to the present exemplary embodiment, which shows an intermediate transfer-type 6-unit tandem image forming apparatus.

The image forming apparatus shown in FIG. 1 includes first to sixth image forming units 10Y, 10M, 10C, 10K, and 10G as electrophotographic image forming means that print out images of colors, pink (P), yellow (Y), magenta (M), cyan (C), black (K), and green (G) based on color-separated image data. These image forming units (hereinafter, simply called "units" in some cases) 10P, 10Y, 10M, 10C, 10K, and 10G are arranged in a row in the horizontal direction in a state of being spaced apart by a predetermined distance. The units 10P, 10Y, 10M, 10C, and 10G may be process cartridges that are detachable from the image forming apparatus.

An intermediate transfer belt (an example of an intermediate transfer member) 20 passing through the units 10P, 10Y, 10M, 10C, 10K, and 10G extends under the units. The intermediate transfer belt 20 is looped around a driving roll 22, a support roll 23, and an opposing roll 24 that are in contact with the inner surface of the intermediate transfer belt 20, and runs toward a sixth unit 10G from a first unit 10P. An intermediate transfer member cleaning device 21 facing the driving roll 22 is provided on the image holding surface side of the intermediate transfer belt 20.

Toners of pink, yellow, magenta, cyan, black, and green stored in containers of toner cartridges 8P, 8Y, 8M, 8C, 8K, and 8G are supplied to developing devices (an example of developing units) 4P, 4Y, 4M, 4C, 4K, and 4G of units 10P, 10Y, 10M, 10C, 10K, and 10G respectively.

The first to sixth units 10P, 10Y, 10M, 10C, 10K, and 10G have the same configuration and perform the same operation. Therefore, in the present specification, as a representative, the sixth unit 10G that forms a green image will be described.

The sixth unit 10G has a photoreceptor 1G that acts as an image holder. Around the photoreceptor 1G, a charging roll 2G (an example of charging unit) that charges the surface of the photoreceptor 1G at a predetermined potential, an exposure device 3G (an example of electrostatic charge image forming unit) that exposes the charged surface to a laser beam based on color-separated image signals to form an electrostatic charge image, a developing device 4G (an example of developing unit) that develops the electrostatic charge image by supplying a toner to the electrostatic charge image, a primary transfer roll 5G (an example of primary transfer unit) that transfers the developed toner image onto the intermediate transfer belt 20, and a photoreceptor cleaning device 6G (an example of cleaning unit) that removes the residual toner on the surface of the photoreceptor 1G after the primary transfer are arranged in this order.

The primary transfer roll 5G is disposed on the inner side of the intermediate transfer belt 20, at a position facing the photoreceptor 1G. A bias power supply (not shown in the drawing) for applying a primary transfer bias is connected to primary transfer rolls 5Y, 5P, 5M, 5G, and 5K of each unit. Each bias power supply changes the transfer bias applied to each primary transfer roll under the control of a control unit not shown in the drawing.

Hereinafter, the operation that the sixth unit 10G carries out to form a green image will be described.

First, prior to the operation, the surface of the photoreceptor 1G is charged to a potential of −600 V to −800 V by the charging roll 2G.

The photoreceptor 1G is formed of a photosensitive layer laminated on a conductive (for example, volume resistivity at 20° C.: $1\times10^{-6}$ Ω·cm or less) substrate. The photosensitive layer has properties in that although this layer usually has a high resistance (resistance of a general resin), in a case where the photosensitive layer is irradiated with a laser beam, the specific resistance of the portion irradiated with the laser beam changes. Therefore, from an exposure device 3G, the laser beam is radiated to the surface of the charged photoreceptor 1G according to the image data for green transmitted from the control unit not shown in the drawing. As a result, an electrostatic charge image of the green image pattern is formed on the surface of the photoreceptor 1G.

The electrostatic charge image is an image formed on the surface of the photoreceptor 1G by charging. This image is a so-called negative latent image formed in a manner in which the charges with which the surface of the photoreceptor 1G is charged flow due to the reduction in the specific resistance of the portion of the photosensitive layer irradiated with the laser beam from the exposure device 3G, but the charges in a portion not being irradiated with the laser beam remain.

The electrostatic charge image formed on the photoreceptor 1G rotates to a predetermined development position as the photoreceptor 1G runs. At the development position, the electrostatic charge image on the photoreceptor 1G is developed as a toner image by the developing device 4G and visualized.

The developing device 4G contains, for example, an electrostatic charge image developer that contains at least a green toner and a carrier. By being agitated in the developing device 4G, the green toner undergoes triboelectrification, carries charges of the same polarity (negative polarity) as the charges with which the surface of the photoreceptor 1G is charged, and is held on a developer roll (an example of a developer holder). Then, as the surface of the photoreceptor 1G passes through the developing device 4G, the green toner electrostatically adheres to the neutralized latent image portion on the surface of the photoreceptor 1G, and the latent image is developed by the green toner. The photoreceptor 1G on which the green toner image is formed keeps on running at a predetermined speed, and the toner image developed on the photoreceptor 1G is transported to a predetermined primary transfer position.

In a case where the green toner image on the photoreceptor 1G is transported to the primary transfer position, a primary transfer bias is applied to the primary transfer roll 5G, and electrostatic force heading for the primary transfer roll 5G from the photoreceptor 1G acts on the toner image. As a result, the toner image on the photoreceptor 1G is transferred onto the intermediate transfer belt 20. The transfer bias applied at this time has a polarity (+) opposite to the polarity (−) of the toner. In the six unit 10G, the transfer bias is set, for example, to +10 μA under the control of the control unit (not shown in the drawing).

The photoreceptor 1G having transferred the toner image to the intermediate transfer belt 20 keeps rotating to come into contact with a cleaning blade included in a photoreceptor cleaning device 6G. The residual toner on the photoreceptor 1G is removed by the photoreceptor cleaning device 6G and collected.

The intermediate transfer belt 20 is sequentially transported through the first to sixth image forming units 10P, 10Y, 10M, 10C, 10K, and 10G, and the toner images of each color are superposed and transferred in layers.

The intermediate transfer belt 20, to which the toner images of six colors are transferred in layers through the first to six units, reaches a secondary transfer portion configured with the intermediate transfer belt 20, the opposing roll 24 in contact with the inner surface of the intermediate transfer belt, and a secondary transfer roll 26 (an example of a secondary transfer unit) disposed on the image holding surface side of the intermediate transfer belt 20. Meanwhile, via a supply mechanism, recording paper P (an example of a recording medium) is supplied at a predetermined timing to the gap between the secondary transfer roll 26 and the intermediate transfer belt 20 that are in contact with each other. Furthermore, secondary transfer bias is applied to the opposing roll 24. The transfer bias applied at this time has the same polarity (−) as the polarity (−) of the toner. The electrostatic force heading for the recording paper P from the intermediate transfer belt 20 acts on the toner image, which makes the toner image on the intermediate transfer belt 20 transferred onto the recording paper P. The secondary transfer bias to be applied at this time is determined according to the resistance detected by a resistance detecting unit (not shown in the drawing) for detecting the resistance of the secondary transfer portion, and the voltage thereof is controlled.

The intermediate transfer belt 20 having transferred the toner image to the recording paper P keeps running to come into contact with a cleaning blade included in the intermediate transfer member cleaning device 21. The residual toner on the intermediate transfer belt 20 is removed by the intermediate transfer member cleaning device 21 and collected.

The recording paper P onto which the toner image is transferred is transported into a pressure contact portion (nip portion) of a pair of fixing rolls in the fixing device 28 (an example of a fixing unit), the toner image is fixed to the surface of the recording paper P, and a fixed image is formed.

Examples of the recording paper P to which the toner image is to be transferred include plain paper used in electrophotographic copy machines, printers, and the like. Examples of the recording medium also include an OHP sheet and the like, in addition to the recording paper P.

In order to further improve the smoothness of the image surface after fixing, for example, it is preferable that the surface of the recording paper P be also smooth. For instance, coated paper prepared by coating the surface of plain paper with a resin or the like, art paper for printing, and the like are used.

The recording paper P on which the color image has been fixed is transported to an output portion, and a series of color image forming operations is finished.

Process Cartridge and Toner Cartridge

The process cartridge according to the present exemplary embodiment will be described.

The process cartridge according to the present exemplary embodiment includes a developing unit which contains the electrostatic charge image developer according to the present exemplary embodiment and develops an electrostatic charge image formed on the surface of an image holder as a toner image by using the electrostatic charge image developer. The process cartridge is detachable from the image forming apparatus.

The process cartridge according to the present exemplary embodiment is not limited to the above configuration. The process cartridge may be configured with a developing unit and, for example, at least one member selected from other units, such as an image holder, a charging unit, an electrostatic charge image forming unit, and a transfer unit, as necessary.

An example of the process cartridge according to the present exemplary embodiment will be shown below, but the present invention is not limited thereto. Hereinafter, among the parts shown in the drawing, main parts will be described, and others will not be described.

Figure 2:
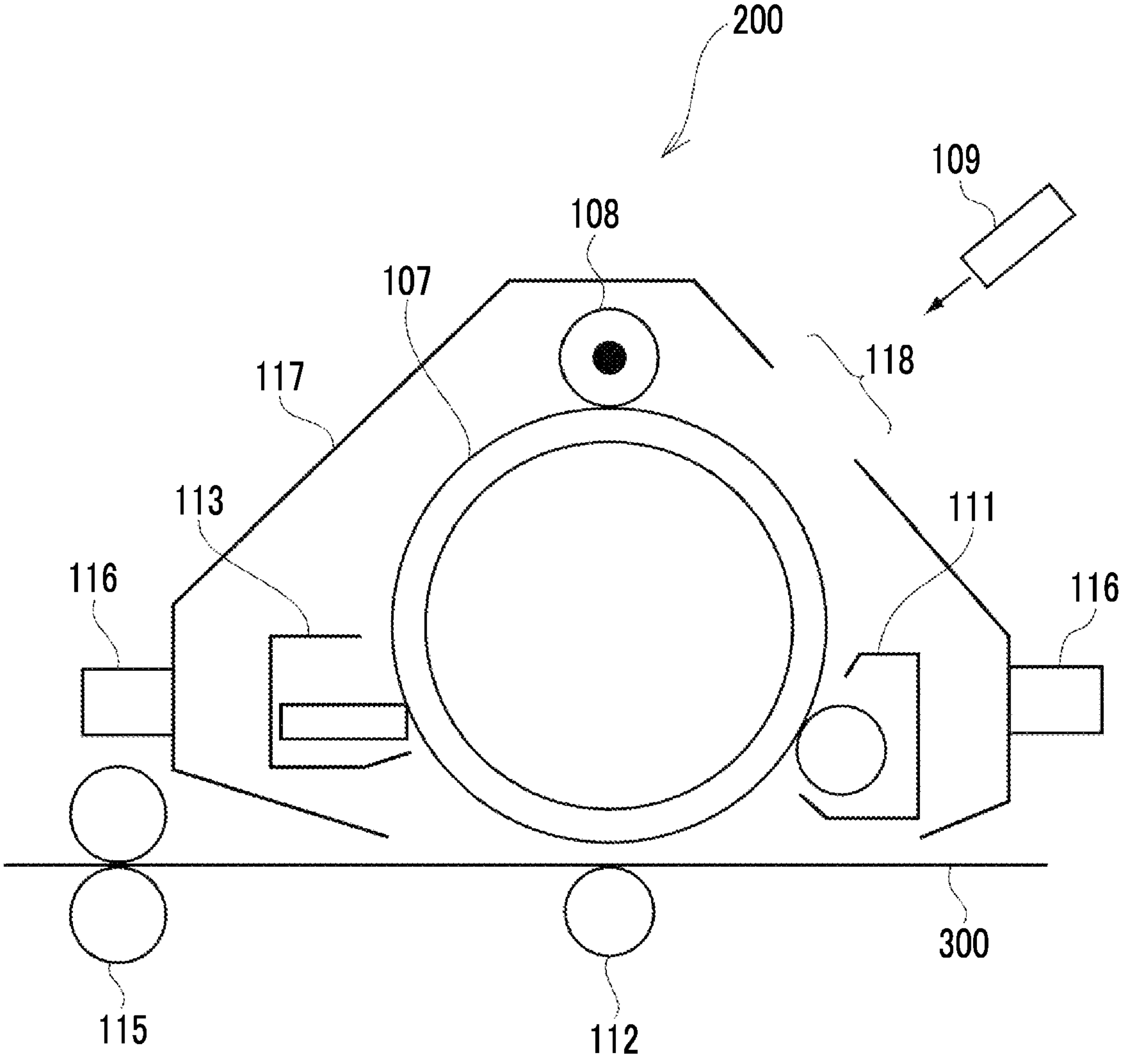
FIG. 2 is a view schematically showing the configuration of an example of a process cartridge detachable from the image forming apparatus according to the present exemplary embodiment.

FIG. 2 is a view schematically showing the configuration of the process cartridge according to the present exemplary embodiment.

A process cartridge 200 shown in FIG. 2 is configured, for example, with a housing 117 that includes mounting rails 116 and an opening portion 118 for exposure, a photoreceptor 107 (an example of an image holder), a charging roll 108 (an example of a charging unit) that is provided on the periphery of the photoreceptor 107, a developing device 111 (an example of a developing unit), a photoreceptor cleaning device 113 (an example of a cleaning unit), which are integrally combined and held in the housing 117. The process cartridge 200 forms a cartridge in this way.

In FIG. 2, 109 represents an exposure device (an example of an electrostatic charge image forming unit), 112 represents a transfer device (an example of a transfer unit), 115 represents a fixing device (an example of a fixing unit), and 300 represents recording paper (an example of a recording medium).

Next, the toner cartridge according to the present exemplary embodiment will be described.

The toner cartridge according to the present exemplary embodiment is a toner cartridge including a container that contains the fluorescent green toner according to the present exemplary embodiment and is detachable from the image forming apparatus. The toner cartridge includes a container that contains a replenishing toner to be supplied to the developing unit provided in the image forming apparatus.

The image forming apparatus shown in FIG. 1 is an image forming apparatus having a configuration that enables toner cartridges 8Y, 8P, 8M, 8C, 8G, and 8K to be detachable from the apparatus. The developing devices 4Y, 4P, 4M, 4C, 4G, and 4K are connected to toner cartridges corresponding to the respective colors by a toner supply pipe not shown in the drawing. In a case where the amount of the toner contained in the container of the toner cartridge is low, the toner cartridge is replaced. The toner cartridge 8G is an example of the toner cartridge according to the present exemplary embodiment, and has a container that contains the green toner according to the present exemplary embodiment. The toner cartridges 8P, 8Y, 8M, 8C, and 8K have containers that contain pink, yellow, magenta, cyan, and black toners respectively.

EXAMPLES

Hereinafter, exemplary embodiments of the invention will be specifically described based on examples. However, the exemplary embodiments of the invention are not limited to the examples.

In the following description, unless otherwise specified, "parts" and "%" are based on mass.

Unless otherwise specified, synthesis, treatment, manufacturing, and the like are carried out at room temperature (25° C.±3° C.).

Preparation of Colorant Particle Dispersion (1)

Fluorescent yellow pigment (C.I. Pigment Yellow 101 (manufactured by Radiant Color, Radglo VSF-0-01)): 70 parts Anionic surfactant (manufactured by DKS Co. Ltd., NEOGEN RK): 30 parts (concentration of solid content 20%)

Deionized water: 200 parts

The above components are mixed together and pulverized with a continuous key mill (KMC-3) to 0.3 μm, and the amount of solid content is adjusted to 20% by mass, thereby obtaining a colorant particle dispersion (1).

Preparation of Colorant Particle Dispersion (2)

Non-fluorescent green pigment (C.I. Pigment Green 36 (manufactured by TOYOCOLOR CO., LTD., LIONOL GREEN 8624)): 70 parts Anionic surfactant (manufactured by DKS Co. Ltd., NEOGEN RK): 30 parts (concentration of solid content 20%)

Deionized water: 200 parts

The above components are mixed together and pulverized with a continuous key mill (KMC-3) to 0.15 μm, and the amount of solid content is adjusted to 20% by mass, thereby obtaining a colorant particle dispersion (2).

Preparation of Resin Particle Dispersion (1)

Terephthalic acid: 30 parts by mol

Fumaric acid: 70 parts by mol

Ethylene oxide adduct of bisphenol A: 5 parts by mol

Propylene oxide adduct of bisphenol A: 95 parts by mol

The above materials are put in a flask equipped with a stirrer, a nitrogen introduction tube, a temperature sensor, and a rectifying column, the temperature is raised to 220° C. for an hour, and titanium tetraethoxide is added thereto in an amount of 1 part with respect to 100 parts of the above materials. While the generated water is being distilled off, the temperature is raised to 230° C. for 30 minutes, a dehydrocondensation reaction is continued for 1 hour at 230° C., and then the reactant is cooled. In this way, a polyester resin having a weight-average molecular weight of 18,000 and a glass transition temperature of 60° C. is obtained.

Ethyl acetate (40 parts) and 25 parts of 2-butanol are put in a container equipped with a temperature control unit and a nitrogen purge unit, thereby preparing a mixed solvent. Then, 100 parts of the polyester resin is slowly added to and dissolved in the solvent, a 10% by mass aqueous ammonia solution (in an amount equivalent to 3 times the acid value of the resin in terms of molar ratio) is added thereto, and the mixed solution is stirred for 30 minutes. Thereafter, the container is cleaned out by dry nitrogen purging, and in a state where the mixed solution is being stirred at a temperature kept at 40° C., 400 parts of deionized water is added dropwise thereto at a rate of 2 parts/min. After the dropwise addition ends, the temperature is returned to room temperature (20° C. to 25° C.), and bubbling is performed under stirring for 48 hours by using dry nitrogen, thereby obtaining a resin particle dispersion in which the concentration of ethyl acetate and 2-butanol is reduced to 1,000 ppm or less. Deionized water is added to the resin particle dispersion, and the solid content thereof is adjusted to 20% by mass, thereby obtaining a resin particle dispersion (1).

Preparation of Release Agent Particle Dispersion (1)

Paraffin wax (manufactured by NIPPON SEIRO CO., LTD., HNP-9): 100 parts

Anionic surfactant (manufactured by DKS Co. Ltd., NEOGEN RK): 1 part

Deionized water: 350 parts

The above materials are mixed together, heated to 100° C., and dispersed using a homogenizer (IKA, trade name: ULTRA-TURRAX T50). Then, by using Munton Gorlin high-pressure homogenizer (Gorlin), dispersion treatment is performed, thereby obtaining a release agent particle dispersion (1) (solid content of 20% by mass) in which release agent particles having a volume-average particle size of 200 nm are dispersed.

Preparation of Toner Particles (1)

Resin particle dispersion (1): 340 parts

Colorant particle dispersion (1): 40 parts

Colorant particle dispersion (2): 20 parts

Release agent particle dispersion (1): 50 parts

Anionic surfactant (DKS Co. Ltd., NEOGEN RK, 20%): 10 parts

The above materials are put in a round flask made of stainless steel, 0.1 N (=mol/L) nitric acid is added thereto to adjust the pH to 3.5, and then 30 parts of an aqueous nitric acid solution having a polyaluminum chloride concentration of 10% by mass is added thereto. Then, the obtained solution is dispersed at a liquid temperature of 30° C. by using a homogenizer (manufactured by IKA, trade name ULTRA-TURRAX T50), then heated to 45° C. in an oil bath for heating, and kept as it is for 30 minutes. Subsequently, 50 parts of the resin particle dispersion (1) is added thereto, the reaction solution is kept as it is for 1 hour, a 0.1N aqueous sodium hydroxide solution is added thereto such that the pH is adjusted to 8.5, and the reaction solution is then heated to 84° C. and kept as it is for 2.5 hours. Thereafter, the reaction solution is cooled to 20° C. at a rate of 20° C./min, the solids are separated by filtration, thoroughly washed with deionized water, and dried, thereby obtaining toner particles (1). The volume-average particle size of the toner particles (1) is 5.8 μm.

Preparation of Carrier 1

Ferrite particles (average particle size 35 μm): 100 parts

Toluene: 14 parts

Polymethylmethacrylate (MMA, weight-average molecular weight 75,000): 5 parts

Carbon black: 0.2 parts (VXC-72, manufactured by Cabot Corporation, volume resistivity: 100 Ωcm or less)

The above materials excluding the ferrite particles are dispersed with a sand mill, thereby preparing a dispersion. The dispersion is put in a vacuum deaerating kneader together with the ferrite particles, and dried under reduced pressure while being stirred, thereby obtaining a carrier 1.

Preparation of Toner

Hydrophobic silica (manufactured by Nippon Aerosil Co., Ltd., RY50) and hydrophobic titanium oxide (manufactured by Nippon Aerosil Co., Ltd., T805) are used in an amount of 1.5 parts by mass and 1.0 parts by mass respectively with respect to 100 parts by mass of the obtained toner particles (1), and these are mixed and blended together for 30 seconds by using a sample mill at 10,000 revolutions per minute (rpm. Then, the obtained mixture is sieved using a vibration sieve having an opening size of 45 μm, thereby preparing a toner 1 (fluorescent green toner). The volume-average particle size of the obtained toner 1 is 5.8 μm.

Preparation of Electrostatic Charge Image Developer

The toner (8 parts) and 92 parts of the carrier are mixed together by using a V blender, thereby preparing a developer 1 (electrostatic charge image developer).

Evaluation (Gloss Difference Suppressiveness, Brightness, and Chroma)

A modified image forming apparatus Revoria Press PC1120 manufactured by FUJIFILM Business Innovation Corp. is prepared, and a pink developer, a yellow developer, a magenta developer, a cyan developer, a black developer, and a green developer 1 manufactured by FUJIFILM Business Innovation Corp. are stored in six developing devices of the image forming apparatus respectively. In an environment at a temperature of 22° C. and a humidity of 55% RH, 100 blank images having an image density of 0% are printed on OS coated paper (manufactured by Oji Paper Co., Ltd., trade name: OS COAT 127). Then, Digital Chart No. 7 of The Society of Electrophotography of Japan is printed on one sheet of OS coated paper (manufactured by Oji Paper Co., Ltd., trade name: OS Coat 127) at an image density of 100% (toner application amount of each color: 4.0 g/m$^2$), and then a solid image of the obtained fluorescent green toner is printed on one sheet of OS coated paper (manufactured by Oji Paper Co., Ltd., trade name: OS Coat 127) at an image density of 100% (toner application amount: 4.0 g/m$^2$).

For the obtained solid image, gloss is measured in an image history portion and a non-image history portion of the digital chart No. 7 previously printed out. By using a portable gloss meter (MICRO-TRI-GLOSS manufactured by BYK-Gardner Gmbh), gloss is measured at 5 locations at an angle of 60°, and the average thereof is calculated. A difference between the gloss measured in the image history portion and the gloss measured in the non-image history portion is calculated, and the gloss difference suppressiveness is evaluated based on the following evaluation standard.

G1: The maximum gloss difference between the image history portion and the non-image history portion is less than 1.

G2: The maximum gloss difference between the image history portion and the non-image history portion is 1 or more and less than 3.

G3: The maximum gloss difference between the image history portion and the non-image history portion is 3 or more and less than 5.

G4: The maximum gloss difference between the image history portion and the non-image history portion is 5 or more.

In addition, by using a reflection spectrodensitometer X-Rite 939 (aperture size 4 mm, X-Rite Inc.), the L* value, a* value, and b* value in the CIE1976 L*a*b* color system are measured at 10 locations in the solid image, and the average of the L* value, a* value, and b* value is calculated. Furthermore, the chroma C* is calculated from the following equation. The brightness L* is, for example, preferably 70 or more, and the chroma C* is, for example, preferably 85 or more.

$$\text{Chroma } C^*=\{(a^*)^2+(b^*)^2\}^{0.5}$$

Examples 2 to 4

The preparation of toners and developers and the evaluation are performed in the same manner as in Example 1, except that the type and content of the fluorescent pigment, non-fluorescent pigment, and release agent are changed as shown in Table 1.

Example 5

The preparation of a toner and a developer and the evaluation are performed in the same manner as in Example 1, except that in the preparation of toner particles, the reaction solution is heated to 84° C., kept at 84° C. for 2.5 hours, cooled to 80° C. for 20 minutes, and then cooled to at a rate of 20° C./min.

Examples 6 to 9

The preparation of toners and developers and the evaluation are performed in the same manner as in Example 1, except that the type and content of the fluorescent pigment, non-fluorescent pigment, and release agent are changed as shown in Table 1.

Example 10

The preparation of a toner and a developer and the evaluation are performed in the same manner as in Example 1, except that in the preparation of toner particles, the reaction solution is heated to 84° C., kept at 84° C. for 2.5 hours, cooled to 80° C. for 30 minutes, and then cooled to at a rate of 20° C./min.

Example 11

Toner particles are prepared by the following kneading and pulverizing method.

Amorphous polyester resin (weight-average molecular weight 18,000, glass transition temperature 60° C.): 155.4 parts C.I. Pigment Yellow 101: 16 parts C.I. Pigment Green 36: 8 parts Paraffin wax (HNP-9, NIPPON SEIRO CO., LTD.): 20.6 parts The above materials are put in a Henschel mixer (FM75L, NIPPON COKE & ENGINEERING. CO., LTD.) and mixed together by rotation at a rotation speed of 20/sec for minutes, thereby obtaining a toner composition. Next, the mixture is kneaded with a twin-screw kneading extruder (TEM-48SS, SHIBAURA MACHINE CO., LTD.) set to a temperature of 150° C., the kneaded product is rolled and cooled to a temperature equal to lower than 30° C. The obtained kneaded product is coarsely pulverized with a hammer mill to a size of 1 mm or less, and then finely pulverized with a jet mill (AFG, Hosokawa Micron Group). The pulverized resultant is classified with an elbow jet classifier (EJ-LABO, Nittetsu Mining Co., Ltd.), thereby obtaining green toner particles having a volume-average particle size of 6.5 μm. Thereafter, the preparation of a toner and a developer and the evaluation are performed in the same manner as in Example 1.

Comparative Examples 1 and 2

The preparation of toners and developers and the evaluation are performed in the same manner as in Example 1, except that the non-fluorescent pigment is changed as shown in Table 1.

Examples 12 to 21

The preparation of toners and developers and the evaluation are performed in the same manner as in Example 1, except that the type and content of the fluorescent pigment, non-fluorescent pigment, and release agent are changed as shown in Table 1.

TABLE 1

| | Fluorescent pigment | | | | | Non-Fluorescent pigment | | | | Release agent |
|---|---|---|---|---|---|---|---|---|---|---|
| | Type | Type of hydrophilic group | Mass ratio of hydrophilic group | Azomethine bond | Content | Type | Main structure | Type of halogen atom | Content | Type |
| Example 1 | PY101 | OH | 10% | Present | 8.0% | PG36 | Phthalocyanine | Cl, Br | 4.0% | Paraffin |
| Example 2 | PY101 | OH | 10% | Present | 8.0% | PG7 | Phthalocyanine | Cl | 4.0% | Paraffin |
| Example 3 | PY101 | OH | 10% | Present | 8.0% | PG36 | Phthalocyanine | Cl, Br | 4.0% | Paraffin |
| Example 4 | PY101 | OH | 10% | Present | 8.0% | PG36 | Phthalocyanine | Cl, Br | 4.0% | Polyethylene |
| Example 5 | PY101 | OH | 10% | Present | 8.0% | PG36 | Phthalocyanine | Cl, Br | 4.0% | Paraffin |
| Example 6 | PY101 | OH | 10% | Present | 8.0% | PG10 | Azomethine | Cl | 4.0% | Paraffin |
| Example 7 | Azomethine compound (3) | OH | 14% | Present | 8.0% | PG36 | Phthalocyanine | Cl, Br | 4.0% | Paraffin |
| Example 8 | PY101 | OH | 10% | Present | 8.0% | PG36 | Phthalocyanine | Cl, Br | 4.0% | Paraffin |
| Example 9 | PY101 | OH | 10% | Present | 8.0% | PG36 | Phthalocyanine | Cl, Br | 4.0% | Estar |
| Example 10 | PY101 | OH | 10% | Present | 8.0% | PG36 | Phthalocyanine | Cl, Br | 4.0% | Paraffin |
| Comparative Example 1 | PY101 | OH | 10% | Present | 8.0% | PG1 | Dyed lake | n/a | 4.0% | Paraffin |
| Comparative Example 2 | PY101 | OH | 10% | Present | 8.0% | PB15:3 | Phthalocyanine | n/a | 4.0% | Paraffin |
| Example 12 | PY101 | OH | 10% | Present | 10.0% | PG36 | Phthalocyanine | Cl, Br | 4.0% | Paraffin |
| Example 13 | PY101 | OH | 10% | Present | 8.0% | PG36 | Phthalocyanine | Cl, Br | 6.0% | Paraffin |
| Example 14 | PY101 | OH | 10% | Present | 11.4% | PG36 | Phthalocyanine | Cl, Br | 0.6% | Paraffin |
| Example 15 | PY101 | OH | 10% | Present | 11.0% | PG36 | Phthalocyanine | Cl, Br | 1.1% | Paraffin |
| Example 16 | PY101 | OH | 10% | Present | 6.6% | PG36 | Phthalocyanine | Cl, Br | 5.4% | Paraffin |
| Example 17 | PY101 | OH | 10% | Present | 6.0% | PG36 | Phthalocyanine | Cl, Br | 6.0% | Paraffin |
| Example 18 | PY101 | OH | 10% | Present | 4.8% | PG36 | Phthalocyanine | Cl, Br | 7.2% | Paraffin |
| Example 19 | PY101 | OH | 10% | Present | 3.3% | PG36 | Phthalocyanine | Cl, Br | 1.7% | Paraffin |
| Example 20 | PY101 | OH | 10% | Present | 6.6% | PG36 | Phthalocyanine | Cl, Br | 3.4% | Paraffin |
| Example 21 | PY101 | OH | 10% | Present | 10.0% | PG36 | Phthalocyanine | Cl, Br | 5.0% | Paraffin |

| | Release agent | | | | | | | |
|---|---|---|---|---|---|---|---|---|
| | Ratio of domain diameter | Content | Structure of toner particles | Gloss difference suppressiveness | Hue of toner image | Brightness L' | Chroma C' | Hue angle h |
| Example 1 | 10% | 10.0% | Core/shell | G1 | Green | 78 | 96 | 137.1 |
| Example 2 | 10% | 10.0% | Core/shell | G2 | Green | 76 | 93 | 137.6 |
| Example 3 | 10% | 20.0% | Core/shell | G1 | Green | 78 | 96 | 137.1 |
| Example 4 | 10% | 10.0% | Core/shell | G2 | Green | 78 | 96 | 137.1 |
| Example 5 | 25% | 10.0% | Core/shell | G2 | Green | 78 | 96 | 137.1 |
| Example 6 | 10% | 10.0% | Core/shell | G3 | Yellowish green | Unmeasured | Unmeasured | Unmeasured |
| Example 7 | 10% | 10.0% | Core/shell | G3 | Green | 74 | 94 | 137.1 |

TABLE 1-continued

| | | | | | | | | |
|---|---|---|---|---|---|---|---|---|
| Example 8 | 10% | 1.0% | Core/shell | G3 | Green | 78 | 96 | 137.1 |
| Example 9 | 10% | 10.0% | Core/shell | G2 | Green | 78 | 96 | 137.1 |
| Example 10 | 30% | 10.0% | Core/shell | G3 | Green | 78 | 96 | 137.1 |
| Comparative Example 1 | 10% | 10.0% | Core/shell | G4 | Bluish green | Unmea-sured | Unmea-sured | Unmea-sured |
| Comparative Example 2 | 10% | 10.0% | Core/shell | G4 | Bluish green | 63 | 85 | 139.5 |
| Example 12 | 10% | 10.0% | Core/shell | G1 | Green | 78 | 98 | 135.5 |
| Example 13 | 10% | 10.0% | Core/shell | G1 | Green | 76 | 96 | 140.0 |
| Example 14 | 10% | 10.0% | Core/shell | G3 | Yellowish green | 79 | 97 | 128.8 |
| Example 15 | 10% | 10.0% | Core/shell | G2 | Yellowish green | 78 | 96 | 130.8 |
| Example 16 | 10% | 10.0% | Core/shell | G1 | Green | 76 | 95 | 140.1 |
| Example 17 | 10% | 10.0% | Core/shell | G1 | Green | 76 | 96 | 142.2 |
| Example 18 | 10% | 10.0% | Core/shell | G1 | Green | 75 | 97 | 144.2 |
| Example 19 | 10% | 10.0% | Core/shell | G1 | Green | 83 | 86 | 137.8 |
| Example 20 | 10% | 10.0% | Core/shell | G1 | Green | 81 | 93 | 136.3 |
| Example 21 | 10% | 10.0% | Core/shell | G1 | Green | 70 | 101 | 137.0 |

In Table 1, "Ratio of domain diameter" of a release agent represents the ratio of the domain diameter of a release agent to the volume-average particle size of the toner particles, and "Content" of a release agent represents the content of a release agent with respect to the total mass of the toner particles.

The symbols in Table 1 mean the following pigments or dyes.

PY101: C.I. Pigment Yellow 101 (manufactured by Radiant Color, Radglo VSF-0-01, emission peak wavelength 520 nm), an azomethine fluorescent pigment having a hydroxy group Azomethine compound (3): the azomethine compound (3) (the azomethine compound (3) is prepared by the following method) (emission peak wavelength 520 nm), an azomethine fluorescent pigment having a hydroxy group PG36: C.I. Pigment Green 36 (manufactured by TOYOCOLOR CO., LTD., LIONOL GREEN 8624, hue: yellowish green), a non-fluorescent copper phthalocyanine pigment having a chlorine atom and a bromine atom PG7: C.I. Pigment Green 7 (manufactured by TOYOCOLOR CO., LTD., LIONOL GREEN 8390, hue: bluish green), a non-fluorescent copper phthalocyanine pigment having a chlorine atom PG10: C.I. Pigment Green 10 (manufactured by BASF SE, PaliotolYellow L-0830, hue: yellowish green), a non-fluorescent azomethine pigment having a chlorine atom PG1: C.I. Pigment Green 1 (manufactured by BASF SE, Fanal Green D 8330, hue: bluish green), a dyed lake pigment having no halogen atom PB15:3: C.I. Pigment Blue 15:3 (manufactured by TOYOCOLOR CO., LTD., LIONOL BLUE FG-7330, hue: blue), a non-fluorescent copper phthalocyanine pigment having no halogen atom Polyethylene: polyethylene wax (manufactured by TOYO ADL CORPORATION, PW725)

Ester: ester wax (manufactured by NOF Corporation, WEP-5)

Preparation of Azomethine Compound (3)

Hydrazine hydrate: 100 parts by mol

Salicylaldehyde: 200 parts by mol

Ethanol and the above materials are put in a flask equipped with a stirrer and heated under reflux for 1 hour while water generated on a water bath is being distilled off, and then the reactant is cooled. The precipitated solids are collected by filtration by means of suction filtration, thereby obtaining the azomethine compound (3).

Example 101

Image Formation by Actual Machine

An electrophotographic and intermediate transfer-type 6-unit tandem image forming apparatus is prepared. The 6 developing devices are filled with a pink developer, a yellow developer, a magenta developer, a cyan developer, a black developer, and a green developer (developer of Example 1) respectively. Then, based on the image data obtained by color-separating RGB data into the above 6 colors, an image is formed on A4 size coated paper. The obtained image has excellent color reproducibility close to the original RGB data.

(((1))) A fluorescent green toner comprising:

toner particles containing a binder resin, a release agent, a fluorescent pigment having a hydrophilic group, and a pigment having a halogen atom.

(((2))) The fluorescent green toner according to (((1))), wherein the pigment having a halogen atom is a phthalocyanine compound.

(((3))) The fluorescent green toner according to (((1))) or (((2))), wherein the pigment having a halogen atom has at least one kind of atom selected from the group consisting of a chlorine atom and a bromine atom as the halogen atom.

(((4))) The fluorescent green toner according to any one of (((1))) to (((3))), wherein the pigment having a halogen atom has 4 or more halogen atoms.

(((5))) The fluorescent green toner according to (((4))), wherein the pigment having a halogen atom has 8 or more halogen atoms.

(((6))) The fluorescent green toner according to any one of (((1))) to (((5))), wherein the fluorescent pigment having a hydrophilic group has a hydroxy group as the hydrophilic group.

(((7))) The fluorescent green toner according to (((6))), wherein a ratio of a molecular weight of the hydroxy group to a total molecular weight of one molecule of the fluorescent pigment having a hydrophilic group is 12% by mass or less.

(((8))) The fluorescent green toner according to any one of (((1))) to (((7))), wherein the fluorescent pigment having a hydrophilic group is an azomethine compound.

(((9))) The fluorescent green toner according to any one of (((1))) to (((8))), wherein a content of the release agent is 2% by mass or more and 20% by mass or less with respect to a total mass of the toner particles.

(((10))) The fluorescent green toner according to any one of (((1))) to (((9))), wherein the release agent is a paraffin wax or a polyethylene wax.

(((11))) The fluorescent green toner according to any one of (((1))) to (((10))), wherein a domain diameter of the release agent in the toner particles is equal to or less than 25% of a volume-average particle size of the toner particles.

(((12))) The fluorescent green toner according to any one of (((1))) to (((11))), wherein the toner particles have a core/shell structure.

(((13))) An electrostatic charge image developer comprising:

the fluorescent green toner according to any one of (((1))) to (((12))).

(((14))) A toner cartridge comprising:

a container that contains the fluorescent green toner according to any one of (((1))) to (((12))), wherein the toner cartridge is detachable from an image forming apparatus.

(((15))) A process cartridge comprising:

a developing unit that contains the electrostatic charge image developer according to (((13))) and develops an electrostatic charge image formed on a surface of an image holder as a toner image by using the electrostatic charge image developer, wherein the process cartridge is detachable from an image forming apparatus.

(((16))) An image forming apparatus comprising:

an image holder;

a charging unit that charges a surface of the image holder;

an electrostatic charge image forming unit that forms an electrostatic charge image on the charged surface of the image holder;

a developing unit that contains the electrostatic charge image developer according to (((13))) and develops the electrostatic charge image formed on the surface of the image holder as a toner image by using the electrostatic charge image developer;

a transfer unit that transfers the toner image formed on the surface of the image holder to a surface of a recording medium; and a fixing unit that fixes the toner image transferred to the surface of the recording medium.

(((17))) An image forming method comprising:

charging a surface of an image holder;

forming an electrostatic charge image on the charged surface of the image holder;

developing the electrostatic charge image formed on the surface of the image holder as a toner image by using the electrostatic charge image developer according to (((13)));

transferring the toner image formed on the surface of the image holder to a surface of a recording medium; and fixing the toner image transferred to the surface of the recording medium.

(((18))) An image forming apparatus comprising:

first to sixth electrophotographic image forming units forming images of each of colors of pink, yellow, magenta, cyan, black, and green, wherein an image forming unit that forms a green image contains the electrostatic charge image developer according to (((13))).

(((19))) An image forming method comprising:

forming first to sixth electrophotographic images of each of colors of pink, yellow, magenta, cyan, black, and green, wherein the electrostatic charge image developer according to (((13))) is used in forming a green image.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A fluorescent green toner comprising:

toner particles containing a binder resin, a release agent, a fluorescent pigment having a hydrophilic group, and a pigment having a halogen atom, wherein a domain diameter of the release agent in the toner particles is equal to or less than 25% of a volume-average particle size of the toner particles.

2. The fluorescent green toner according to claim 1, wherein the pigment having a halogen atom is a phthalocyanine compound.

3. The fluorescent green toner according to claim 1, wherein the pigment having a halogen atom has at least one kind of atom selected from the group consisting of a chlorine atom and a bromine atom as the halogen atom.

4. The fluorescent green toner according to claim 1, wherein the pigment having a halogen atom has 4 or more halogen atoms.

5. The fluorescent green toner according to claim 4, wherein the pigment having a halogen atom has 8 or more halogen atoms.

6. The fluorescent green toner according to claim 1, wherein the fluorescent pigment having a hydrophilic group has a hydroxy group as the hydrophilic group.

7. The fluorescent green toner according to claim 6, wherein a ratio of a molecular weight of the hydroxy group to a total molecular weight of one molecule of the fluorescent pigment having a hydrophilic group is 12% by mass or less.

8. The fluorescent green toner according to claim 1, wherein the fluorescent pigment having a hydrophilic group is an azomethine compound.

9. The fluorescent green toner according to claim 1, wherein a content of the release agent is 2% by mass or more and 20% by mass or less with respect to a total mass of the toner particles.

10. The fluorescent green toner according to claim 1, wherein the release agent is a paraffin wax or a polyethylene wax.

11. The fluorescent green toner according to claim 1, wherein the toner particles have a core/shell structure.

12. An electrostatic charge image developer comprising: the fluorescent green toner according to claim 1.

13. An electrostatic charge image developer comprising: the fluorescent green toner according to claim 2.

14. A toner cartridge comprising:

a container that contains the fluorescent green toner according to claim 1, wherein the toner cartridge is detachable from an image forming apparatus.

15. A process cartridge comprising:

a developing unit that contains the electrostatic charge image developer according to claim 12 and develops an electrostatic charge image formed on a surface of an image holder as a toner image by using the electrostatic charge image developer, wherein the process cartridge is detachable from an image forming apparatus.

16. An image forming apparatus comprising:

an image holder;

a charging unit that charges a surface of the image holder;

an electrostatic charge image forming unit that forms an electrostatic charge image on the charged surface of the image holder;

a developing unit that contains the electrostatic charge image developer according to claim 13 and develops the electrostatic charge image formed on the surface of the image holder as a toner image by using the electrostatic charge image developer;

a transfer unit that transfers the toner image formed on the surface of the image holder to a surface of a recording medium; and a fixing unit that fixes the toner image transferred to the surface of the recording medium.

17. An image forming method comprising:

charging a surface of an image holder;

forming an electrostatic charge image on the charged surface of the image holder;

developing the electrostatic charge image formed on the surface of the image holder as a toner image by using the electrostatic charge image developer according to claim 12;

transferring the toner image formed on the surface of the image holder to a surface of a recording medium; and fixing the toner image transferred to the surface of the recording medium.

18. An image forming apparatus comprising:

a plurality of electrophotographic image forming units, wherein the plurality of electrophotographic image forming units comprises a pink image forming electrophotographic image forming unit, a yellow image forming electrophotographic image forming unit, a magenta image forming electrophotographic image forming unit, a cyan image forming electrophotographic image forming unit, a black image forming electrophotographic image forming unit and a green image forming electrophotographic image forming unit, wherein each of the plurality of electrophotographic image forming units comprises:

an image holder;

a charging unit that charges a surface of the image holder;

an electrostatic charge image forming unit that forms an electrostatic charge image on the charged surface of the image holder;

a developing unit that contains an electrostatic charge image developer and develops the electrostatic charge image formed on the surface of the image holder as a toner image;

a transfer unit that transfers the toner image formed on the surface of the image holder to a surface of a recording medium; and a fixing unit that fixes the toner image transferred to the surface of the recording medium, wherein the green image forming electrophotographic image forming unit contains the electrostatic charge image developer according to claim 12.

19. An image forming method comprising:

forming a plurality of electrophotographic images, wherein the plurality of electrophotographic image comprises a pink electrophotographic image, a yellow electrophotographic image, a magenta electrophotographic image, a cyan electrophotographic image, a black electrophotographic image and a green electrophotographic image, wherein forming the green electrophotographic image comprises:

a charging step of charging a surface of an image holder;

an electrostatic charge image forming step of forming an electrostatic charge image on the charged surface of the image holder;

a developing step of developing the electrostatic charge image formed on the surface of the image holder as a toner image by using the electrostatic charge image developer according to claim 12;

a transfer step of transferring the toner image formed on the surface of the image holder to a surface of a recording medium; and a fixing step of fixing the toner image transferred to the surface of the recording medium.

* * * * *